United States Patent [19]

Miller

[11] 4,264,902
[45] Apr. 28, 1981

[54] MOISTURE ALARM

[76] Inventor: James W. Miller, 705 Flintlock Dr., Bel Air, Md. 21014

[21] Appl. No.: 119,537

[22] Filed: Feb. 7, 1980

[51] Int. Cl.³ ............................................. G08B 21/00
[52] U.S. Cl. .................................... 340/604; 340/602
[58] Field of Search ............... 340/604, 602, 603, 620, 340/605; 324/448; 73/304 R, 307, 308, 322.5

[56] References Cited

U.S. PATENT DOCUMENTS

| | | | |
|---|---|---|---|
| 1,217,036 | 2/1917 | McManus | 340/604 |
| 2,611,643 | 9/1952 | Higgins | 340/604 |
| 2,812,976 | 11/1957 | Hasenkamp | 340/604 |
| 3,122,736 | 2/1964 | Weber | 340/604 |
| 3,186,224 | 6/1965 | Mair | 73/304 R |
| 3,200,388 | 8/1965 | Uhlig | 340/604 |
| 3,278,921 | 10/1966 | Horino | 340/623 |
| 3,733,594 | 5/1973 | Orth, Jr. | 340/603 |
| 3,824,460 | 7/1974 | Gustafson | 340/605 |
| 3,927,370 | 12/1975 | De Bough | 340/604 |
| 3,942,167 | 3/1976 | McClintock | 340/620 |
| 4,020,417 | 4/1977 | Brchob et al. | 340/623 |
| 4,182,363 | 1/1980 | Fuller | 340/620 |

OTHER PUBLICATIONS

"Water Alert Surface Water Sensing System, Publication of Electro-Consultants Inc.", 1/5/80, Greenfield, Wisconsin.

*Primary Examiner*—Gerald L. Brigance
*Attorney, Agent, or Firm*—John F. McClellan, Sr.

[57] ABSTRACT

A moisture alarm comprises a watertight system with three probes extending down as supportive legs and as ballast from a floatable body or case containing audible and/or RF pulsing-alarm circuitry responsive to moisture detected by any or all of the probes; the case is upwardly convex on top to slip from beneath fixed obstacles in rising water; a provision prevents the probe from shorting out when the unit is set on a metal deck; the free ends of the probes, each of which has a set of outer and inner coaxial electrodes, are apertured, providing access for moisture to reach the inner electrode; a mercury switch sounds the alarm when the unit is tipped over in position lifting inner electrodes from the floor but can be over-ridden by a shunt which permits the unit to be operated inverted as a randdrop alarm; a dual ring conductor embodiment is also disclosed.

11 Claims, 10 Drawing Figures

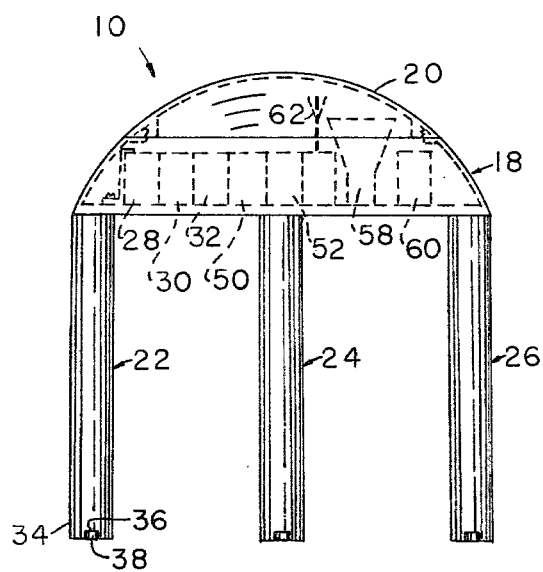
FIG. 1
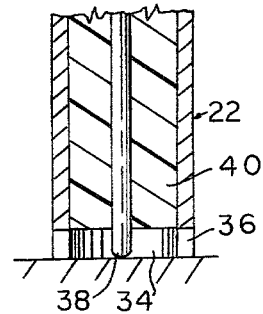
FIG. 2
FIG. 3
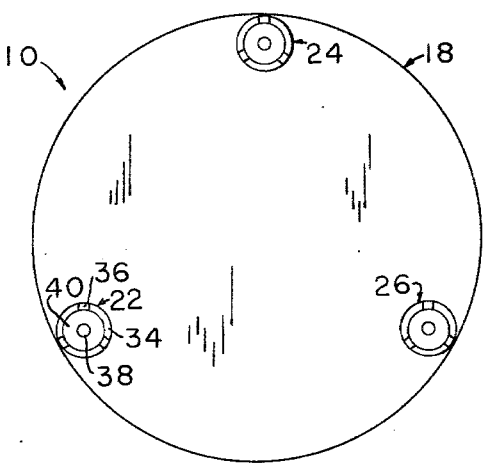
FIG. 4
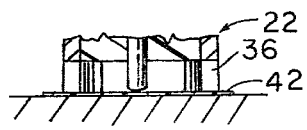

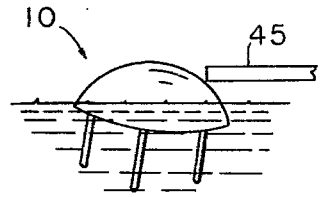
FIG.5
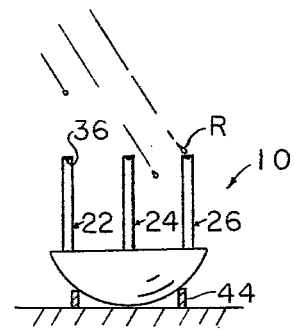
FIG.6
FIG.7
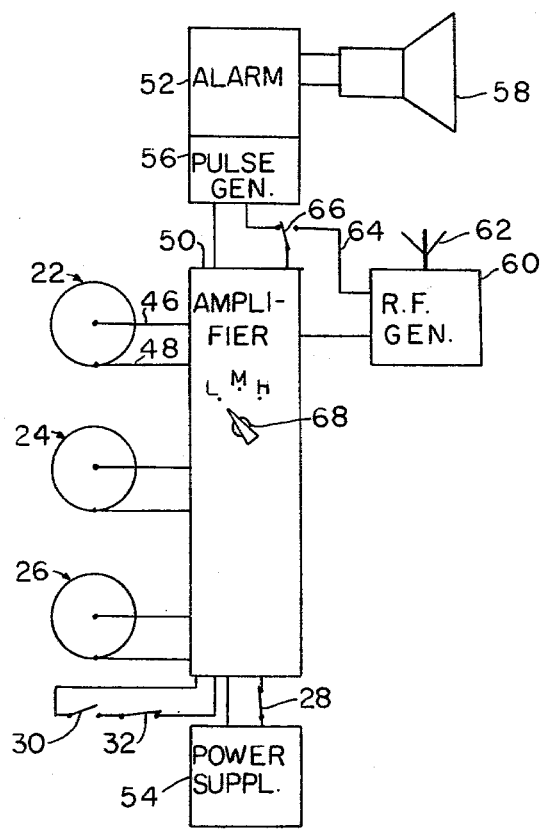

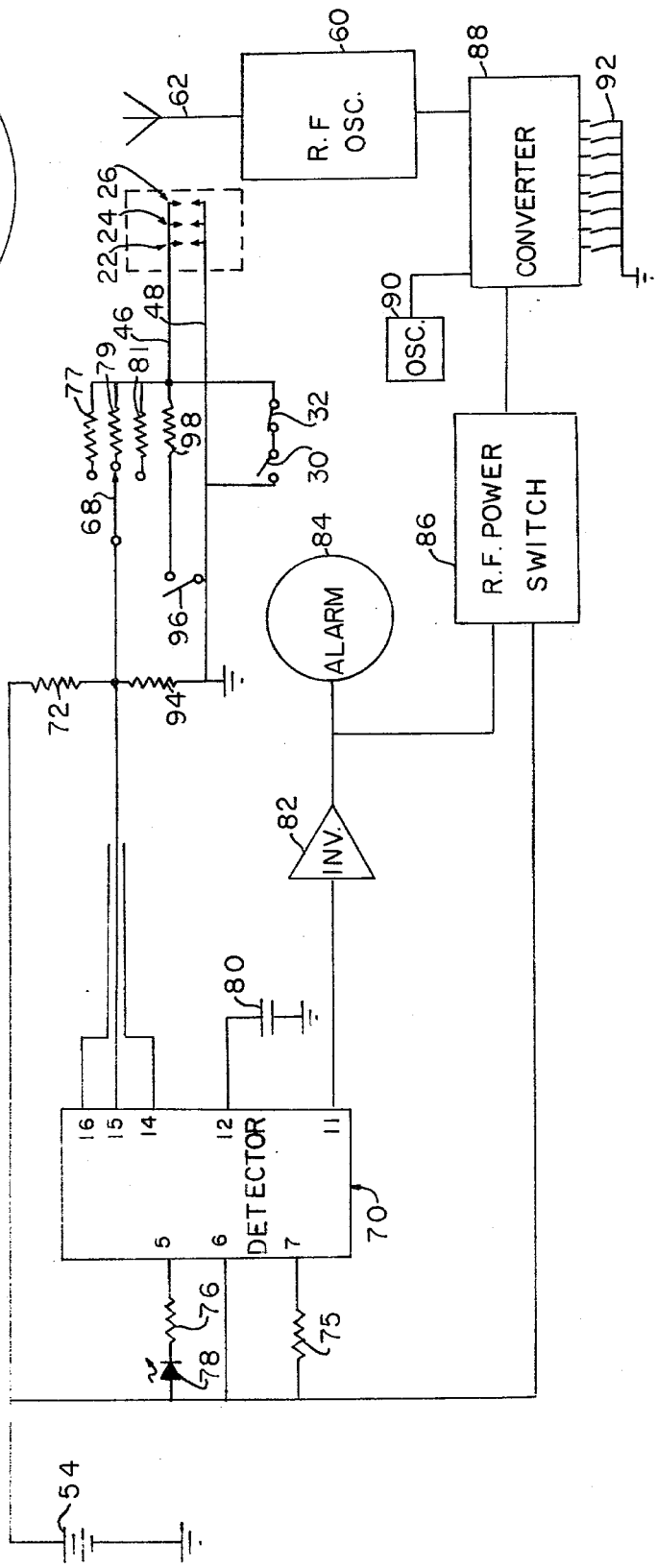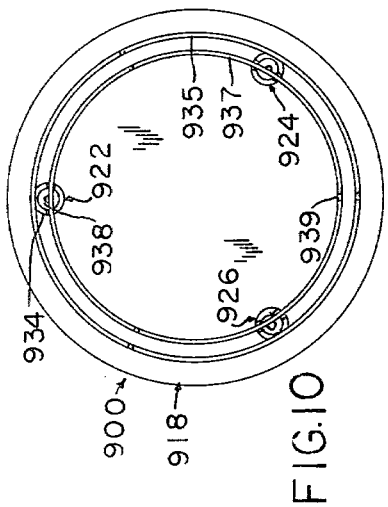
FIG.10
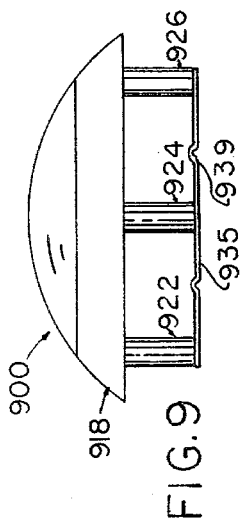
FIG.9
FIG.8

MOISTURE ALARM

This invention relates generally to alarm systems and particularly to an alarm system for warning of the presence of water or the like.

Millions of dollars are lost annually by homeowners, industries and insurance companies, to name a few, from water damage which timely warning could have prevented.

Water-alarm systems of various types are known in the prior art, as indicated by the following U.S. Pats.:

No. 3,122,736 to R. B. Weber, 2-25-64, discloses a body-attached battery operated signalling unit which activates in water by motion of a switch;

No. 3,278,921 to M. Horino, 10-11-66, discloses a self-contained, floating, battery operated, pulsing, water-on-electrode activated signalling unit;

No. 3,824,460 to R. V. Gustafson, 7-16-64, discloses a leakage sensor for floors;

No. 4,020,417 to A. W. Brehob and C. E. Wheeler, 4-26-77, discloses use of a moisture probe in a battery powered pulsing-signal unit.

In addition, bell-ringing rain warnings of the type exemplified by U.S. Pat. No. 1,217,036 have long been known; such use a variety of actuation means, including float switches, spring-biased switches held open by a tension member of ordinary paper which will tear when wet, etc.

However, no known system is believed to provide the advantages which the present invention will, including those set forth in the following objects.

Principal objects of this invention are to provide a self-contained, self-powered moisture detection system which provides an audible alarm when in contact with moisture, which is self-protective and can prevent submersion and thus provide the alarm at full strength regardless of water level and which is difficult for rising water to defeat.

Further objects are to provide a system as described which can be used as a rain detector and can activate before the surface on which it is resting receives any moisture, a system which can be used on conductive floors such as steel as well as on non-conductive floors, and which can respond to small traces of water such as high humidity will sometimes produce.

Among the locations in which the present invention could be used to monitor for flooding are basements, pump houses, storage areas, laundry rooms and open areas and the like, and much loss of time and effort can be avoided as well as monetary loss through such use. For example, the invention, being portable, can be used to warn of incoming water from river or stream flooding. Because sump pumps and drains clog, some people sleep in the basement so that they can have earlier warning of leakage from heavy rains or other flooding, and use of the invention could avoid need for this. Boats could have units according to this invention installed in the bilge, with or without special harness to hold the units, and the alarm could be remotely broadcast by radio frequency as by walkie-talkie, or even by integral transmitter. Vaults and contents and other closed areas lacking air circulation could be economically protected by alarms warning of build-up of excess humidity. Blowing rain could be detected at open windows and the alarm given. As another example, plumbers and others could use the invention to warn of leaks in piping of remote locations.

During crisis times accompanied by or caused by flooding, electric power service is often interrupted, but such would have no effect on the self-powered self-protecting alarm system of this invention.

In brief summary given as cursive description only and not as limitation, the invention includes a battery powered floatable alarm with probe feet and a convex upper part for preventing catching under obstacles when floating.

The above and other objects and advantages of this invention will become more readily understood on examination of the following description, including the drawings in which like reference numerals refer to like parts:

FIG. 1 is a side elevational diagram of the invention in position for use as a moisture detector on a floor;

FIG. 2 is a sectional, enlarged scale detail of a probe foot;

FIG. 3 is a bottom plan view;

FIG. 4 is a sectional, enlarged scale detail of an alternate arrangement of a probe foot;

FIG. 5 is a perspective view on a reduced scale of the invention serving as a floating alarm system;

FIG. 6 is a perspective view of the invention in use as a raindrop alarm system;

FIG. 7 is a block diagram of parts of the invention;

FIG. 8 is a diagram detailing a circuit;

FIG. 9 is a side elevational view of a second embodiment; and

FIG. 10 is a bottom plan view of the second embodiment.

In FIG. 1 the view is slightly distorted for exposition to stress the non-overhang relation of the case at the probes.

FIG. 1 shows major external features of the invention 10 which has the form of an upwardly convex or turtle-shell-shaped case 18 with top 20, and with three moisture-sensitive probes 22, 24, 26 in the form of straight legs extending down from the bottom case perimeter parallel with each other. The plastic coaxial arcuate top 20 of the case unscrews to provide access to the interior.

The case contains power and sensing and alarm and control elements 28, 30, 32, 58, 60, 62, 50, etc. as will be described in reference to later Figures. These may be conventionally clamped in place. The case may be of thin metal such as aluminum and the probes may have similar thin metal tubing exteriors forming enclosing tubes which have respective watertight connections, as by welding, with the case.

The lower end of each probe serves as an outer or first electrode 34, and a radial aperture 36 in this outer, tubular electrode for fluid to pass inward to a central or inner or second electrode 38 which extends down as a foot upon which the unit rests on a surface in the stable manner of a three-legged stool.

In the Figures, the clearances between and below electrodes are exaggerated for exposition; they may be on the order of a fraction of a millimeter.

FIG. 2 shows a bottom-end section of a typical probe 22, with outer electrode 34 and central electrode 38 sealed in coaxial spacing by conventional insulative material 40 such as solid polystyrene or other any suitable heavier than water dielectric. As indicated, one or more radial apertures 36 insure that fluid will have access to the interior to short-out the outer and inner or respective first and second electrodes and set-off the alarm circuit to attract attention to the leak or other cause of unwanted wetness in the area. The coaxial relation of the electrodes provides a multiplicity of actuation paths between them, any one of which will set off the alarm.

FIG. 3 shows the bottom plan view with case 18 having the probes 22, 24, 26, equally spaced around it, each having outer electrode 34 and central or inner electrode 38 separated by insulation 40, and apertures 36 in outer electrode.

FIG. 4 shows a provision for using the probes on metal floors or on uneven conductive surfaces, to prevent shorting out the electrodes by means other than moisture. An insulative spacer 42 may be cemented on the bottom of each probe and preferably extends over and beyond the first electrode periphery a distance as an insulative margin. This may be plastic or it may be an insulative tape.

This structure leaves the apertures 36 free to receive moisture but forms an insulative shoe on each probe for preventing shorting out by non-fluids.

FIG. 5 shows how the case will float in upward position with the probes hanging down as ballast. This keeps the alarm portion up out of the water, assures that when the water drains away the probes will stll be in operating location, and permits the case to shed and slip from under fixed obstacles as at 45.

FIG. 6 shows the invention 10 propped in inverted position in use as a raindrop alarm, raindrops R will short out the electrodes at the ends of the probes 22, 24, 26. Because the apertures 36 reach all the way to the insulation, the inverted probes form no cup, and raindrops can drain out so that the alarm will shut off when rain stops falling rather than running the batteries down.

The prop 44 can be a ring such as a can top ring and will hold the unit stably upside down even though the top is made to be the lightest part, the batteries are placed low in the case along with other heavy parts. It is evident that the angle of support is somewhat adjustable because of the smooth overall convexity of shape.

FIG. 7 diagrams features, some optional, which may be incorporated in the invention. Each of the three probes 22, 24, 26 has connections 46, 48 with amplifier, alarm and power supply circuits at 50, 52, and 54 in the case. All electronic circuits and elements are conventional and any suitable known circuits of the type may be used, those given later being typical examples.

For the alarm, a pulse generator 56 may be used to produce an intermittent alarm sound through a speaker or horn 58 when the probes close the circuit in the presence of moisture.

As an optional feature, an R. F. oscillator or generator 60 may be used to broadcast the alarm through an antenna 62, through a circuit 64 and switch 66. If this feature is to be used the case should be of rigid thermoplastic such as polystyrene with the antenna inside.

The main power switch is indicated at 28. If desired, a mercury switch 30 may be incorporated to actuate the alarm should the unit be knocked over lifting the electrode from the floor at any time that the main switch is on, regardless of whether moisture is present. To inactivate the mercury switch when the unit is to be inverted as a raindrop alarm, a disabling switch 32 may be provided in series with it. A sensitivity selector for the probes may be provided as at 68.

FIG. 8 gives details of a conventional circuit which may be used with the invention, except that parallel connection of the probes and the mercury switch and disabling switch for it are specific details of this invention.

Power supply 54 may be a 9 volt battery, Mallory M N 1604 or equivalent.

The three sets of electrodes respectively in 22, 24, 26 connect in series-parallel circuit 46, 48, through sensitivity switch 68 which is adjustable to three positions to vary resistance at 77, 79, 81 and connect through pin 15 to 70, the detector, which may be a Motorola microprocessor MC14466, to which pin the power supply also connects through resistor 72.

To cause the alarm to sound when the unit is accidentally inverted, mercury switch 30 connects in parallel with the sets of electrodes in the probes, and to disable switch 30, permitting inverted operation, manual switch 32 is provided in series with the mercury switch.

Resistor 75 connects the power supply with pin 7 and resistor 76 similarly, through diode 78 connects it with pin 5. Capacitor 80 connects pin 12 to ground. Pin 11 connects through inverter 82 to sounder or horn 84 which may be a Sonalert SC12. The inverter may be a 2N3904 or 2N3906 and may connect through optional RF power switch 86, which may be a TIP122, to 88, a parallel-to-serial converter CD4021 or equivalent, provided with a conventional oscillator 90 and having conventional DIP switch 92 connection to ground for selection of coding and an output through 60 which may be a 2NS770 one-transistor pulse-modulated RF oscillator, which outputs through antenna 62. Any suitable RF receiver may be used such as a Linear Corporation Model Delta 3.

Adjustment of the circuitry is conventional, the relative value of resistor 75 and capacitor 80 being set for desired horn off-on timing. A test resistor 94 connecting with ground and pin 15 provides for testing by switch 96 across the probe lines with matching resistor 98 in series with one side.

FIGS. 9 and 10 show a further embodiment, 900, except as noted similar to the first embodiment, but providing forsensing moisture in a circle equal to the diameter of the greatest dimension of the instrument.

The electrodes include additionally first and second conductors 935, 937 concentric with each other and with the housing 918, and forming a spaced double ring held by the three probes 922, 924, 926. The first and outer conductor 934 may be soldered or otherwise be electrically and mechanically affixed to the outer electrode 935 in each probe, clear of the inner electrode 938. Similarly the second or inner conductor 937 secures electrically and mechanically to the inner electrode 938 clear of the outer electrode but in plane with it. The conduits may be of one sixteenth-inch (1.5 mm) diameter and of hard-temper copper spaced about twenty thousandths inch (0.5 mm) apart and extend in-plane with each other slightly below the lower ends of the three probes. To permit flow of liquid past the conduits each conduit may form a slight upward arch 939 at intervals between the probes. In this embodiment the diameter of the casing or housing may be substantially greater than the length of the probes, giving the whole apparatus a close-coupled aspect. Additional weight of the conduits helps ballast the instrument upright when floating.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system having means for sensing the presence of moisture and sounding an alarm, the improvement comprising: a case, a plurality of probes extending downwardly from the case as legs supporting the case; each probe including first and second electrodes, means spacing apart the first and second electrodes, and circuit means in said case responsive to the first and second electrodes for sounding an alarm in the presence of moisture forming a conductive path across the first and second electrodes, said case and probes being watertight and said system being floatative, said probes being sufficiently heavy relative to the case for causing the case to float above the probes with the upper portion of the case above water level when floating in water.

2. In a system as recited in claim 1, the case being circular with the upper portion thereof having upwardly convex shape for preventing the case from hanging on obstacles when floating.

3. In a system as recited in claim 2, the probes being three in number for stability when resting on uneven surfaces, and the probes being substantially parallel and coextensive.

4. In a system as recited in claim 1, each first electrode being tubular and coaxially disposed about each respective second electrode.

5. In a system as recited in claim 4, each first electrode having a radial aperture therein for admitting moisture to the respective said second electrode.

6. In a system as recited in claim 4, all said first and second electrodes being substantially coextensive.

7. In a system as recited in claim 5, means for preventing shorting between first and second electrodes when resting on conductive surfaces such as metal floors, comprising an insulative spacer over the lower end of each probe.

8. In a system as recited in claim 5, said system being invertible for use as a raindrop detector, means insulatively separating each first electrode from the respective second electrode, and each radial aperture reaching to the means insulatively separating for draining rainwater out of each probe when said system is inverted for use as a raindrop detector.

9. In a system as recited in claim 2, a first ring-shaped conductor connecting all said first electrodes and a second ring shaped conductor spaced in-plane from the first ring-shaped conductor and connecting all said second electrodes.

10. In a system as recited in claim 9, the diameter of the case being substantially greater than the length of the probe.

11. In a system as recited in claim 9, the first and second ring-shaped electrodes having arched clearances for liquid to flow therepast.

* * * * *